United States Patent
Liu et al.

(10) Patent No.: US 9,036,488 B2
(45) Date of Patent: May 19, 2015

(54) FAULTY LINK DETECTION METHOD, APPARATUS, NODE, AND SYSTEM

(71) Applicant: Huawei Technologies Co., Ltd, Shenzhen (CN)

(72) Inventors: Shuying Liu, Beijing (CN); Haizhou Xiang, Beijing (CN); Haibin Chen, Shenzhen (CN); Youqing Yang, Nanjing (CN); Hewen Zheng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 13/918,571

(22) Filed: Jun. 14, 2013

(65) Prior Publication Data

US 2013/0279347 A1    Oct. 24, 2013

Related U.S. Application Data

(63) Continuation of application No. PCT/CN2011/081285, filed on Oct. 25, 2011.

(30) Foreign Application Priority Data

Dec. 15, 2010   (CN) .......................... 2010 1 0601481

(51) Int. Cl.
*H04L 12/26*   (2006.01)
*H04L 12/24*   (2006.01)
*H04N 21/643*  (2011.01)
*H04N 21/647*  (2011.01)
*H04N 21/43*   (2011.01)
*H04L 29/06*   (2006.01)

(52) U.S. Cl.
CPC .......... *H04L 41/06* (2013.01); *H04N 21/64322* (2013.01); *H04N 21/6473* (2013.01); *H04L 65/80* (2013.01); *H04N 21/4305* (2013.01); *H04L 43/0811* (2013.01); *H04L 43/0829* (2013.01)

(58) Field of Classification Search
None
See application file for complete search history.

(56) References Cited

U.S. PATENT DOCUMENTS

| 2002/0032717 | A1  | 3/2002  | Malan et al. |
| 2006/0268300 | A1* | 11/2006 | Suzuki ........................... 358/1.9 |
| 2007/0019564 | A1* | 1/2007  | Park .............................. 370/252 |

(Continued)

FOREIGN PATENT DOCUMENTS

| CN | 1815970 A   | 8/2006 |
| CN | 101166122 A | 4/2008 |

(Continued)

OTHER PUBLICATIONS

Brownlee, N. et al., "Traffic Flow Measurement: Architecture," Network Working Group, Oct. 1999, 49 pages.

(Continued)

*Primary Examiner* — Hong Cho
(74) *Attorney, Agent, or Firm* — Slater & Matsil, L.L.P.

(57) ABSTRACT

A faulty link detection method includes receiving statistical data that is reported by all nodes every preset quantity of packets that carry a program clock reference value. All the nodes collect statistical data starting from a unified program clock reference value. The quantity of packets lost between an upstream node and a downstream node among all the nodes is acquired according to the statistical data. A faulty link is determined according to the quantity of packets lost between the upstream node and the downstream node.

16 Claims, 5 Drawing Sheets

(56) References Cited

U.S. PATENT DOCUMENTS

| | | |
|---|---|---|
| 2008/0192647 A1 | 8/2008 | Chew et al. |
| 2008/0253314 A1 | 10/2008 | Stephenson et al. |
| 2010/0008250 A1* | 1/2010 | Nomura et al. ............... 370/252 |
| 2010/0149992 A1* | 6/2010 | Tan ............................... 370/242 |
| 2012/0263072 A1 | 10/2012 | Wu |

FOREIGN PATENT DOCUMENTS

| | | |
|---|---|---|
| CN | 101616037 A | 12/2009 |
| CN | 101646099 A | 2/2010 |
| CN | 101729296 A | 6/2010 |
| CN | 101808021 A | 8/2010 |
| CN | 102137282 A | 7/2011 |
| EP | 1280297 A2 | 1/2003 |

OTHER PUBLICATIONS

European Search Report received in Application No. 11849700.7-1908 mailed Dec. 2, 2013, 9 pages.

International Search Report received in International Application No. PCT/CN2011/081285 mailed Feb. 16, 2012, 4 pages.

Chinese Search Report received in Application No. 201010601481.3 mailed Jun. 20, 2013, 6 pages.

Schulzrinne, H. et al., "RTP: A Transport Protocol for Real-Time Applications," Network Working Group, Jul. 2003, 111 pages.

Welch, J. et al., "A Proposed Media Delivery Index (MDI)," Network Working Group, Apr. 2006, 11 pages.

DSL Forum, Technical Report TR-126, Triple-play Services Quality of Experience (QoE) Requirements, Dec. 13, 2006, 129 pages.

Written Opinion of the International Searching Authority received in Application No. PCT/CN2011/081285 mailed Feb. 16, 2012, 7 pages.

* cited by examiner

FAULTY LINK DETECTION METHOD, APPARATUS, NODE, AND SYSTEM

CROSS-REFERENCE TO RELATED APPLICATIONS

This application is a continuation of International Application No. PCT/CN2011/081285, filed on Oct. 25, 2011, which claims priority to Chinese Patent Application No. 201010601481.3, filed on Dec. 15, 2010, both of which are hereby incorporated by reference in their entireties.

TECHNICAL FIELD

The present disclosure relates to the field of interactive internet protocol television technologies, and in particular, to a faulty link detection method, apparatus, node, and system.

BACKGROUND

IPTV (Internet Protocol Television, interactive internet protocol television) is a technology that provides a home user with a variety of interactive services including a digital television by using a broadband IP network. The IPTV mainly provides a user with a video service, and therefore has a very high requirement on a transport network. Once the transport network fails to meet a transport quality requirement of the IPTV, quality degradation phenomena such as mosaic, a pause, and a skip of a video picture occur, which seriously affects QoE (Quality of Experience) of a terminal user. Therefore, once a problem occurs in the transport network, an IPTV service operator desires to quickly and timely locate which link where the problem occurs in the transport network, that is, to implement fault location.

In an existing IPTV network, a network fault is detected through an MDI (Media Delivery Index). Specifically, the MDI includes two measurement indicators, namely, a DF (Delay Factor) and an MLR (Media Loss Rate). A DF value indicates delay and jitter conditions of a tested video stream, and an MLR value indicates a packet loss rate in transmission of the tested video stream. After obtaining a DF value and an MLR value, each monitoring node sends, according to its own timing mechanism, the test value to a management center periodically; and by respectively comparing DF values and MLR values reported by different nodes periodically, the management center can obtain that a jitter occurs between which devices and a packet loss occurs between which devices. For example, upstream and downstream values are DF1 and MLR1, and DF2 and MLR2 respectively. If DF1=5 ms, MLR1=0; DF2=40 ms, and MLR2=5, it indicates that a jitter (DF) of video on an upstream device is small but a jitter (DF) on a downstream device is quite large, and it indicates that a jitter occurs between the two devices. Ideal IP video stream transmission requires that an MLR value should be zero. Because the MLR1 of the upstream device is equal to 0, it indicates that there is no packet loss in this period, while because the MLR2 of the downstream device is equal to 5, it indicates that a packet loss (5 TSs (Transport Stream) per second) occurs on the downstream device in this period, and a link between the upstream node and the downstream node is a faulty link.

SUMMARY OF THE INVENTION

After analyzing the prior art, the inventor finds the prior art has at least the following defects. A DF value is a value in the statistical sense, and calculation is based on an MR (Media Ratio, code rate of a media stream) and a number difference between bytes received in a current measurement time period. The DF value only reflects a change of a code rate of a media stream, and cannot accurately weigh whether a pause or skip occurs in a current video picture of a terminal decoder. Furthermore, the DF value loses its reference value for a variable bit rate of a media stream. Secondly, calculation of an MLR requires a TS CC (Transport Stream Continuity Counter), but the CC has only 4 bits and a repetition period is too short. Therefore an actual media loss rate cannot be calculated accurately. Moreover, clocks of nodes may not be synchronous, and even though the clocks are synchronous, start points for detecting a video stream as well as timing mechanisms for reporting of the nodes may also be inconsistent. Due to the foregoing problems, a management center cannot perform accurate comparison between upstream and downstream nodes according to a reported calculation result of detection, and therefore it is difficult to accurately solve a problem of fault location as desired by the operator.

To find a faulty link more accurately, embodiments of the present disclosure provide a faulty link detection method, apparatus, node, and system. The technical solutions are as follows.

In one aspect, a faulty link detection method is provided, where the method includes receiving statistical data that is reported by all nodes every preset quantity of packets that carry a program clock reference value, where all the nodes collect statistical data starting from a unified program clock reference value, and the statistical data includes a start program clock reference value and an end program clock reference value, and the quantity of packets received at the start program clock reference value and the quantity of packets received at the end program clock reference value acquiring, according to the statistical data, the quantity of packets lost between an upstream node and a downstream node among all the nodes, and determining a faulty link according to the quantity of packets lost between the upstream node and the downstream node.

In one aspect, a faulty link detection apparatus is provided, where the apparatus includes a receiving module, configured to receive statistical data that is reported by all nodes every preset quantity of packets that carry a program clock reference value, where all the nodes collect statistical data starting from a unified program clock reference value, and the statistical data includes a start program clock reference value and an end program clock reference value, and the quantity of packets received at the start program clock reference value and the quantity of packets received at the end program clock reference value, an acquiring module, configured to acquire, according to the statistical data, the quantity of packets lost between an upstream node and a downstream node among all the nodes, and a determining module, configured to determine a faulty link according to the quantity of packets lost between the upstream node and the downstream node.

In another aspect, a node is provided, where the node includes a first receiving module, configured to receive an enabling instruction delivered by a link fault detection apparatus, and acquire a current program clock reference value a statistics module, configured to collect statistical data starting from the current program clock reference value, and a sending module, configured to send the statistical data to the link fault detection apparatus every preset quantity of packets that carry a program clock reference value, so that the link fault detection apparatus analyzes the statistical data to determine a faulty link, where the statistical data includes a start program clock reference value and an end program clock reference value, and the quantity of packets received at the start program clock reference value and the quantity of packets received at the end program clock reference value.

In another aspect, a faulty link detection system is further provided, where the system includes a link fault detection apparatus, configured to receive statistical data that is reported by all nodes every preset quantity of packets that carry a program clock reference value, where all the nodes collect statistical data starting from a unified program clock reference value, and the statistical data includes a start program clock reference value and an end program clock reference value, and the quantity of packets received at the start program clock reference value and the quantity of packets received at the end program clock reference value; acquire, according to the statistical data, the quantity of packets lost between an upstream node and a downstream node among all the nodes; and determine a faulty link according to the quantity of packets lost between the upstream node and the downstream node, and a node, configured to receive an enabling instruction delivered by the link fault detection apparatus and acquire a current program clock reference value; collect statistical data starting from the current program clock reference value; and send the statistical data to the link fault detection apparatus every preset quantity of packets that carry a program clock reference value, so that the link fault detection apparatus analyzes the statistical data to determine the faulty link.

In the technical solutions provided in the embodiments of the present disclosure, statistical data collected at a unified reference time by different network nodes is acquired, and the accurate quantity of packets lost between an upstream node and a downstream node is obtained through comparison, so as to determine a faulty link, thereby effectively ensuring that an IPTV service operator locates a network fault quickly and effectively.

BRIEF DESCRIPTION OF THE DRAWINGS

To illustrate the technical solutions in the embodiments of the present disclosure or in the prior art more clearly, the accompanying drawings required for describing the embodiments or the prior art are briefly described in the following. Apparently, the accompanying drawings in the following description merely show some embodiments of the present disclosure, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present disclosure more comprehensible, the embodiments of the present disclosure are described in further detail in the following with reference to the accompanying drawings.

Before a faulty link detection method provided in the present disclosure is described, basic knowledge of the present disclosure is described briefly first.

PCR (Program Clock Reference) is a synchronization clock of a receiving end and a transmitting end, where the synchronization clock is established by a real-time transmission system to ensure normal working of the receiving end and the transmitting end and consistency of frequencies and phases of the receiving end and the transmitting end. Specifically, at the transmitting end, a counter is used to count a system to form a PCR value, and then the PCR value is transferred together with data to the receiving end at a regular time interval. The receiving end has a local working clock whose rated frequency is the same as that of a clock at the transmitting end, and also has a counter which counts the local clock at the receiving end to form a local clock reference. In this case, the transmitting end extracts the PCR from a transport stream, inserts the PCR as well as coding information of an audio frame and a video frame into a PES (Packetised Elementary Streams) packet, the receiving end puts PCR values that are in the audio frame and the video frame in a buffer and waits for values in audio and video of the transmitting end for comparison, and then controls a voltage-controlled oscillator (VCXO) by using a comparison result. Frequencies of the receiving end and transmitting end are phase-locked through adjustment, so as to implement complete synchronization of sound and images at the receiving end and the transmitting end.

Figure 1:
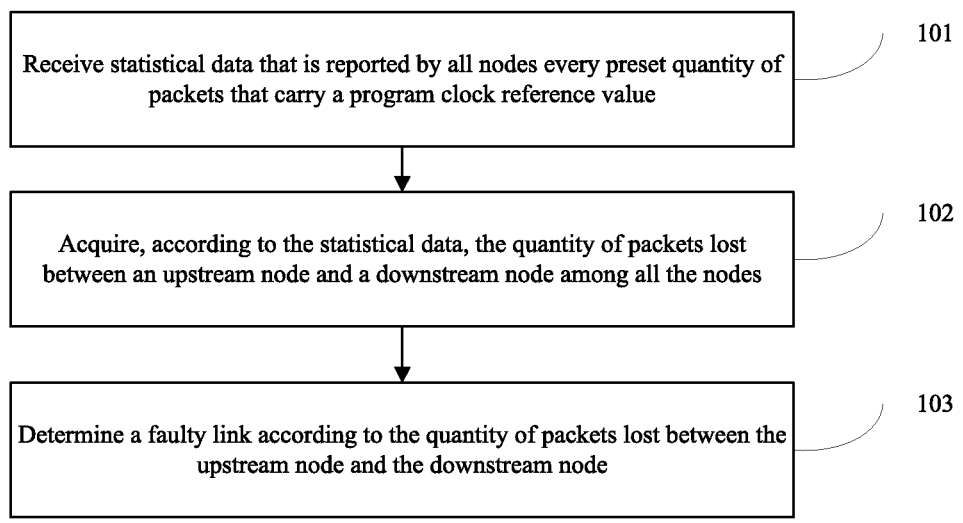
FIG. 1 is a flowchart of a faulty link detection method provided in Embodiment 1 of the present disclosure.

FIG. 1 illustrates a first embodiment (Embodiment 1) of the present disclosure that provides a faulty link detection method. The method includes the following steps.

Step 101: Receive statistical data that is reported by all nodes every preset quantity of packets that carry a program clock reference value.

All the nodes collect statistical data starting from a unified program clock reference value. The statistical data includes a start program clock reference value and an end program clock reference value, and the quantity of packets received at the start program clock reference value and the quantity of packets received at the end program clock reference value.

Step 102: Acquire, according to the statistical data, the quantity of packets lost between an upstream node and a downstream node among all the nodes.

Step 103: Determine a faulty link according to the quantity of packets lost between the upstream node and the downstream node.

The acquiring, according to the statistical data, the quantity of packets lost between the upstream node and the downstream node among all the nodes includes calculating, according to the quantity of packets received at the start program clock reference value and the quantity of packets received at the end program clock reference value, the quantities of packets that are received by all the nodes between the same start program clock reference value and the same end program clock reference value, and calculating, according to the quantities of packets that are received by all the nodes between the same start program clock reference value and the same end program clock reference value, the quantity of packets lost between the upstream node and the downstream node among all the nodes.

In this embodiment, the determining the faulty link according to the quantity of packets lost between the upstream node and the downstream node includes determining whether the quantity of packets lost between the upstream node and the downstream node among all the nodes is zero, and if the quantity is not zero, determining that a link between the upstream node and the downstream node is the faulty link.

Further, in this embodiment, before the calculating the quantities of packets that are received by all the nodes between the same start program clock reference value and the same end program clock reference value, the method further includes determining whether end program clock reference values reported by all the nodes are consistent, if the end program clock reference values are consistent, continuing to perform the step of calculating the quantities of packets that are received by all the nodes between the same start program clock reference value and the same end program clock reference value, and if the end program clock reference values are inconsistent, correcting an end program clock reference value of a node until the end program clock reference values reported by all the nodes are consistent, where the end program clock reference value of the node is inconsistent with end program clock reference values of other nodes, and continuing to perform the step of calculating the quantities of packets that are received by all the nodes between the same start program clock reference value and the same end program clock reference value.

In this embodiment, the correcting the end program clock reference value of the node, where the end program clock reference value of the node is inconsistent with the end program clock reference values of the other nodes, includes sending a correction message to a node whose end program clock reference value is inconsistent with those of the other nodes, so that the node whose end program clock reference value is inconsistent with those of the other nodes modifies the quantity of packets that carry a program clock reference value, where the quantity of packets that carry a program clock reference value is used as its own interval, and collects statistical data at an interval of the modified quantity of program clock reference values.

An execution subject in this embodiment is a faulty link detection apparatus, where the faulty link detection apparatus may be a management center, which is not specifically limited in this embodiment.

In the technical solution provided in the embodiment of the present disclosure, statistical data collected at a unified reference time by different network nodes is acquired, and the accurate quantity of IP packets lost between an upstream node and a downstream node is obtained through comparison, so as to determine a faulty link, thereby effectively ensuring that an IPTV service operator locates a network fault quickly and effectively.

Figure 2:
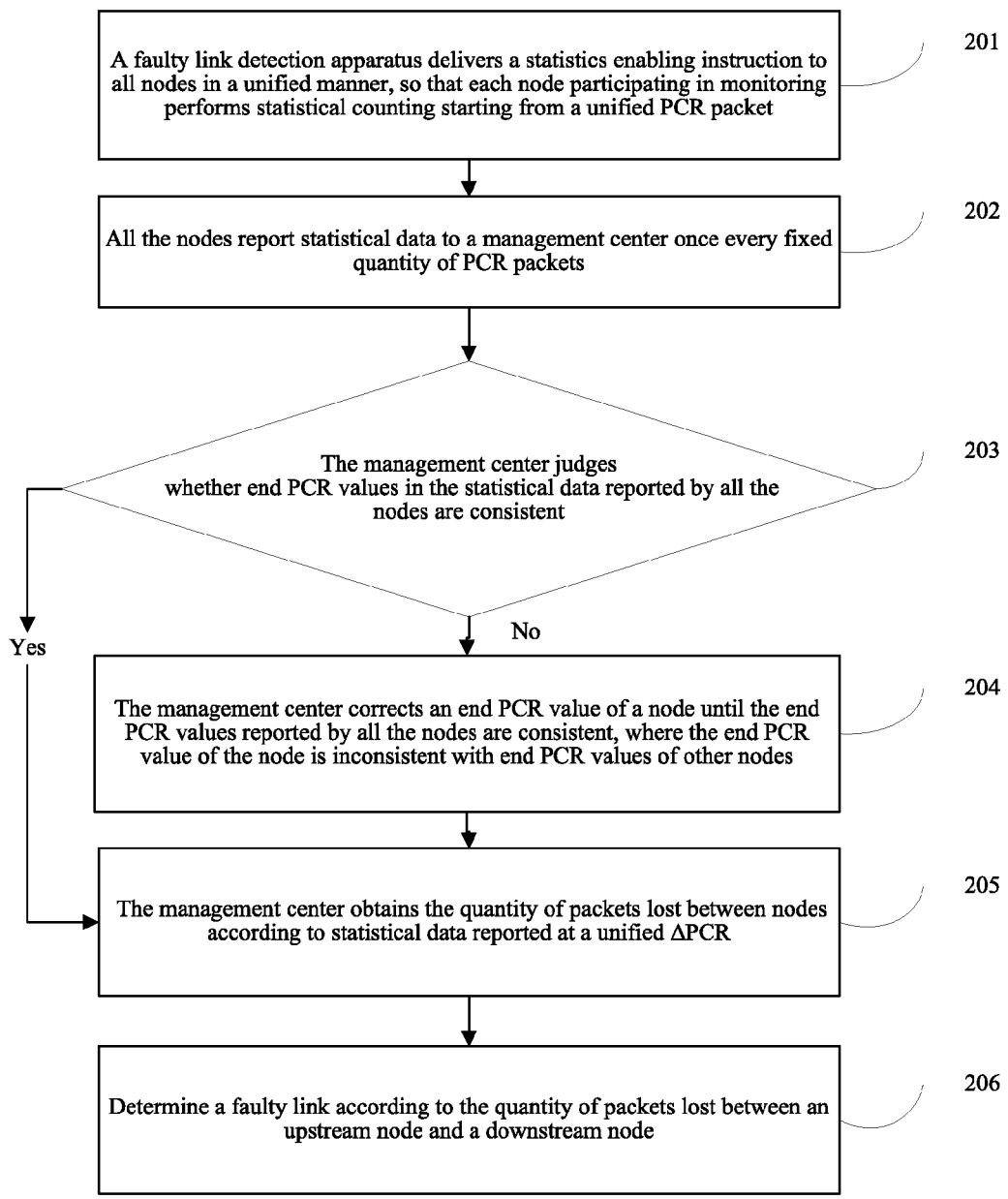
FIG. 2 is a flowchart of a faulty link detection method provided in Embodiment 2 of the present disclosure.

FIG. 2 illustrates a second embodiment (Embodiment 2) of the present disclosure that provides a faulty link detection method. The method includes the following steps. The embodiment will be described with reference to the diagram of FIG. 3.

Step 201: A faulty link detection apparatus delivers a statistics enabling instruction to all nodes in a unified manner, so that each node participating in monitoring performs statistical counting starting from a unified PCR packet.

In this embodiment, each device participating in monitoring may be called a node in a network, a management center is a faulty link detection apparatus, and a PCR packet is a packet that carries a PCR value. The management center delivers a statistics enabling instruction in a unified manner, so that all nodes participating in monitoring have a unified reference standard to ensure accuracy of statistical data. Referring to a schematic diagram of information interaction between nodes and a management center shown in FIG. 3, after the management center delivers a statistics enabling instruction, Node A and Node B acquire a current unified start PCR value, where it is assumed that a start value is PCR (t0), and enable statistics collection to perform counting starting from the current PCR value.

Step 202: All the nodes report statistical data to the management center once every fixed quantity of PCR packets.

In this embodiment, a time interval for all the nodes to report statistical data is preset according to a requirement. To ensure the unity and accuracy of time, an interval of the preset quantity of PCR packets is used as a reference standard. An interval of the quantity of PCR packets is represented by $\Delta PCR$, and $\Delta PCR$=n PCR packets, where n may be 100, 150 and so on, which is not specifically limited in this embodiment.

Figure 3:
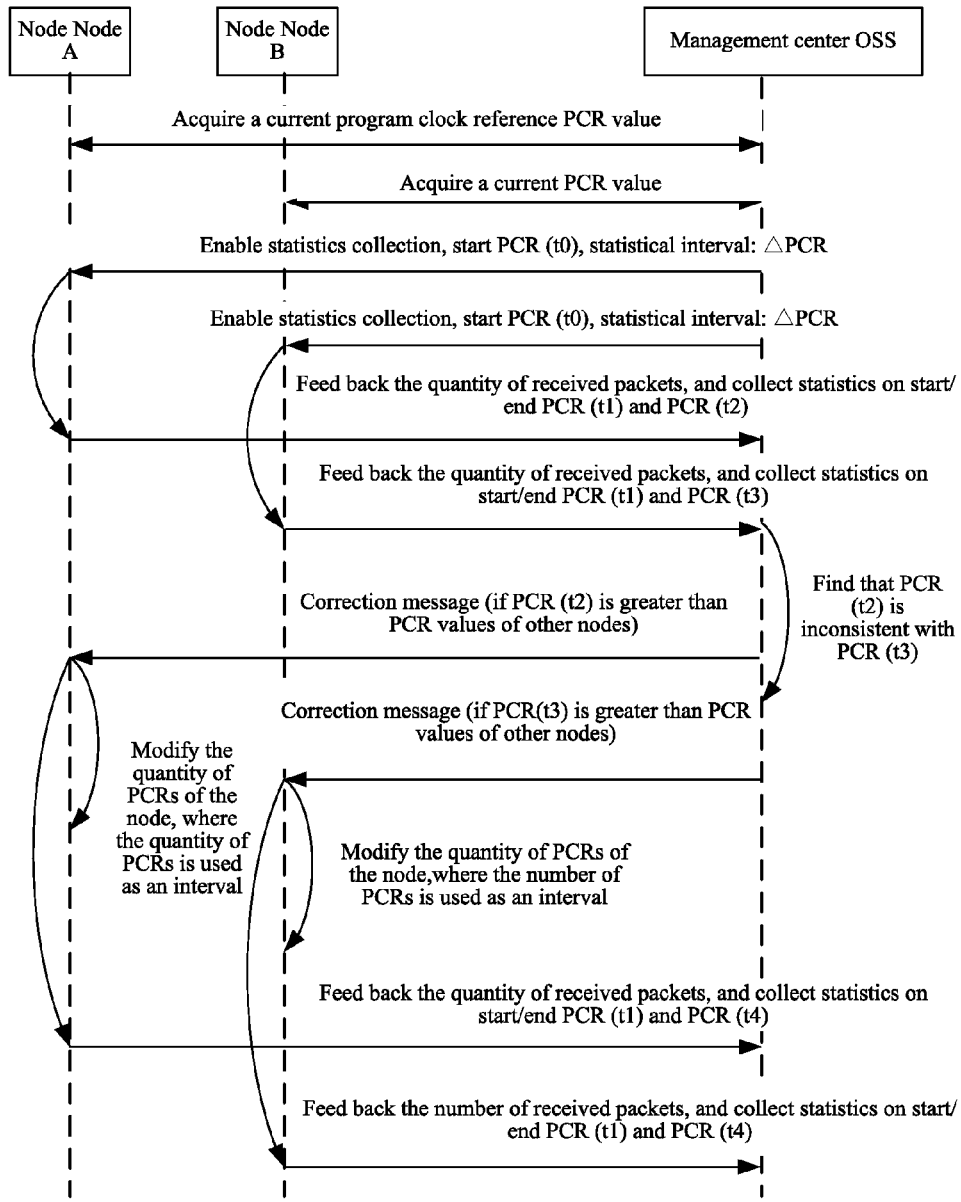
FIG. 3 is a schematic diagram of information interaction between nodes and a management center provided in Embodiment 2 of the present disclosure.

In this embodiment, all the nodes report statistical data to the management center once every preset quantity of PCR packets, where the statistical data includes a start PCR value and an end PCR value, and the quantity of packets received at the start PCR value and the quantity of packets received at the end PCR value. Referring to FIG. 3, Node A and Node B feed back the quantity of received packets to the management center once at an interval of $\Delta PCR$, and collect start/end PCR values. For example, for a PCR of Node A, a start PCR value is (0), and the quantity of packets received at the start PCR value is Num (t1, A); an end PCR value is (t2), and the quantity of packets received at the end PCR value is Num (t2, A); for a PCR of Node B, a start PCR value is (0), and the quantity of packets received at the start PCR value is Num (t1, B); and an end PCR value is (t3), and the quantity of packets received at the end PCR value is Num (t3, B).

Step 203: The management center determines whether end PCR values in the statistical data reported by all the nodes are consistent. If the end PCR values are consistent, perform step 205; and otherwise, perform step 204.

If a PCR packet carrying a PCR value is lost, a problem that end PCR values are inconsistent occurs when the quantity of PCRs at a preset interval is counted. In this embodiment, the management center keeps the statistical data for a certain period of time and checks whether end PCR values in packets that carry PCRs and are reported by monitoring nodes are consistent, and if the end PCR values are consistent, compares statistical counts of received packets of different nodes, and analyzes the quantity of packets lost between which PCR values of which device. If it is found that an end PCR value that is carried in statistical counts reported by a certain node is greater than end PCR values of other nodes, it indicates that the node may lose a PCR packet; and at this time, the management center sends a message to the node for correcting its $\Delta PCR$.

Step 204: The management center corrects an end PCR value of a node until the end PCR values reported by all the nodes are consistent, where the end PCR value of the node is inconsistent with end PCR values of other nodes.

In this embodiment, if received end PCR values are inconsistent, a PCR value received by the monitoring node is corrected first until end PCR values are the same in statistical data reported by monitoring nodes. Referring to FIG. 3, if the management center finds that the PCR (t2) and the PCR (t3) are inconsistent, the management center sends a correction message to a node whose end PCR value is inconsistent with those of other nodes to correct its ΔPCR. The node receiving the correction message modifies the quantity of collected PCR packets, so that when collecting statistical data again, the node whose end PCR value is inconsistent with those of other nodes collects statistics at an interval of the modified quantity of packets, and reports statistical data, for example, a corrected end PCR value is PCR (t4), and the value and the quantity of packets received at the value are reported to the management center.

If the end PCR value of Node A is inconsistent with end PCR values of other nodes, a correction message is sent to Node A; and if the end PCR value of Node B is inconsistent with end PCR values of other nodes, a correction message is sent to Node B. For example, if the preset quantity of PCR packets, which is used as an interval, is 100 and a start PCR value is 1, an end PCR value should be 100. However, the end PCR value of Node A is 101 and end PCR values of other nodes are 100, it indicates that Node A has lost one PCR packet. Then, the management center delivers a correction message to Node A, so that Node A modifies the quantity of PCR packets, where the modified quantity of PCR packets is used as a next interval.

Each time the management center sends a correction message, a node subtracts, according to the correction message, a numerical value from the preset quantity of PCR packets to obtain the quantity of PCR packets, where the quantity of PCR packets is used as an interval. Then, the quantity of PCR packets obtained by Node A as a next interval is 99. In this way, the start PCR value that is sent by Node A and received by the management center again is 102, and the end value should be 200, thereby ensuring that received end PCR values sent by all monitoring devices are the same. An objective is to ensure the same start PCR value and the same end PCR value for the quantity of packets participating in statistics collection, ensure clock synchronization, and avoid inaccuracy of a packet statistical result due to clock inconsistency and avoid final inaccuracy of a link in fault detection.

In this embodiment, after statistical counts are reported according to a new ΔPCR, a device automatically restores the preset quantity of PCR packets (ΔPCR). For example, a value of the new ΔPCR is 99; and then, after end PCR values of all the nodes are modified to be consistent, the monitoring device automatically restores the ΔPCR value to 100.

In this embodiment, if an end PCR value of a certain device is still greater than PCR values of other devices after the correction is performed once, the management center continues to send a message to perform correction, until end PCR values in data reported by statistics nodes are the same. In this embodiment, steps 203 to 204 are optional, which further ensure accuracy of the quantity of lost packets. If it can be ensured that a PCR packet is not lost, accuracy of an end PCR value may also not be checked.

Step 205: The management center obtains the quantity of packets lost between nodes according to statistical data reported at a unified ΔPCR.

In this embodiment, the management center first calculates the quantities of packets that are received by all the nodes between the same start PCR value and the same end PCR value. A specific calculation method is: subtracting the quantity of packets received at the start PCR value from the quantity of packets received at the end PCR value, so as to obtain the quantity of packets received between the same start PCR value and the same end PCR value. After the quantities of packets that are received by all the nodes between the same start PCR value and the same end PCR value are obtained, the quantity of packets lost between an upstream device and a downstream device among all nodes participating in monitoring is calculated.

A specific calculation method can now be described. In the same PCR interval, subtracting the quantity of packets received by the downstream node from the quantity of packets received by the upstream node, so as to obtain the quantity of packets lost between the upstream device and the downstream device. For example, the same start PCR value is PCR (t1) and the same end PCR value is PCR (t4) in FIG. 3; and then, the quantity of packets received between PCR (t1) and PCR (t4) is calculated.

Specific calculation steps are as follows:

(1) assume PCR (t1) is a time point for statistics collection, and the total quantities of packets received by Node A and Node B are: Num (t1, A), and Num (t1, B) respectively;

(2) assume PCR (t4) is a next time point for statistics collection, and the total quantities of packets received by Node A and Node B are: Num (t4, A) and Num (t4, B) respectively; and (3) the quantity of packets lost in a network between Node A and Node B and between PCR (t1) and PCR (t4) is: Diff=Num (t4, A)−Num (t1, A)−[Num (t4, B)−Num (t1, B)].

Optionally, after the quantities of packets that are received by all the nodes between the same start PCR value and the same end PCR value are calculated, whether the quantities of packets received by the nodes within ΔPCR are consistent may be determined first. If the quantities are consistent, it indicates that there is no faulty link; and if the quantities are inconsistent, the quantity of packets lost between an upstream device and a downstream device among all devices participating in monitoring is calculated according to the quantities of packets that are received by all the nodes between the same start PCR value and the same end PCR value, so as to determine a faulty link.

Step 206: Determine a faulty link according to the quantity of packets lost between an upstream node and a downstream node.

In this embodiment, the management center collects statistics, according to a consistent end PCR value, on the quantity of packets respectively received by each node between a previous consistent start PCR value and the consistent end PCR value. In the case of no packet loss, the counts of packets received by different nodes in each reporting period should be consistent, that is, the quantity of packets lost between an upstream monitoring device and a downstream monitoring device is zero. If inconsistency is found, the management center needs to perform comparison, and obtain, through further calculation and analysis, the quantity of packets lost between devices and a device that loses a packet, where whether the quantity of packets lost between the upstream node and the downstream node is zero is determined, and if the quantity is not zero, it indicates that the link is a faulty link. For example, three nodes from an upstream node to a downstream node are A, B, and C respectively, and statistical counts reported in a certain period are 1000, 998, and 900 respectively; and then, the management center obtains, through comparison, that 2 packets are lost between A and B, and 8 packets are lost between B and C. It indicates that packet loss exists both between A and B and between B and C, and a link between A and B and a link between B and C are both faulty links.

In this embodiment, the management center finally provides a client with nodes between which a faulty link exists. If a problem occurs between nodes A and B, nodes A and B are provided for the client, so that the client can find the faulty link in time, and take certain measures to finally ensure video quality for a user side.

Beneficial effects of the technical solution provided in this embodiment of the present disclosure are as follows. A monitoring management center acquires statistical data collected at a unified reference time by different network nodes, and obtains, through comparison, the accurate quantity of packets lost between an upstream node and a downstream node, thereby ensuring that an IPTV service operator locates a network fault quickly and effectively, assisting an operation and maintenance engineer in quickly removing a fault, and improving the quality of operation and maintenance as well as service of an IPTV network.

Figure 4:
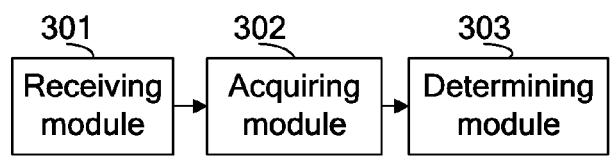
FIG. 4 is a schematic diagram of a faulty link detection apparatus provided in Embodiment 3 of the present disclosure.

Referring to FIG. 4, a third embodiment (Embodiment 3) of the present disclosure provides a faulty link detection apparatus. This embodiment includes a receiving module 301, an acquiring module 302, and a determining module 303.

The receiving module 301 is configured to receive statistical data that is reported by all nodes every preset quantity of packets that carry a program clock reference value, where all the nodes collect statistical data starting from a unified program clock reference value, and the statistical data includes a start program clock reference value and an end program clock reference value, and the quantity of packets received at the start program clock reference value and the quantity of packets received at the end program clock reference value.

The acquiring module 302 is configured to acquire, according to the statistical data, the quantity of packets lost between an upstream node and a downstream node among all the nodes.

The determining module 303 is configured to determine a faulty link according to the quantity of packets lost between the upstream node and the downstream node.

Figure 5:
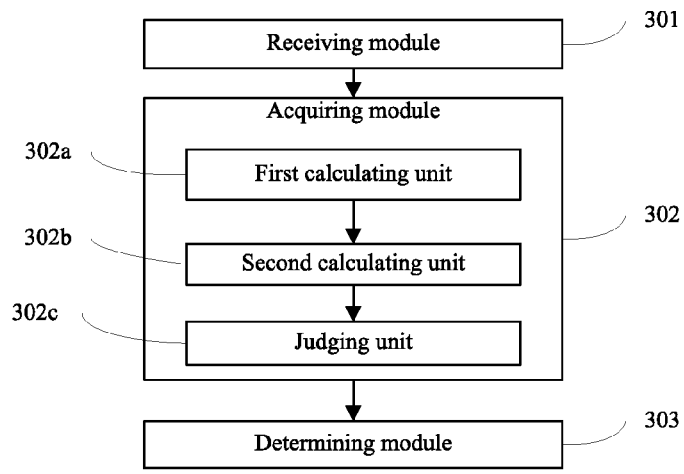
FIG. 5 is a schematic diagram of another faulty link detection apparatus provided in Embodiment 3 of the present disclosure.

FIG. 5 illustrates a more specific example. In this embodiment, the acquiring module 302 includes a first calculating unit 302a, configured to calculate, according to the quantity of packets received at the start program clock reference value and the quantity of packets received at the end program clock reference value, the quantities of packets that are received by all the nodes between the same start program clock reference value and the same end program clock reference value, and a second calculating unit 302b, configured to calculate, according to the quantities of packets that are received by all the nodes between the same start program clock reference value and the same end program clock reference value, the quantity of packets lost between the upstream node and the downstream node among all the nodes.

The determining module 303 is specifically configured to determine whether the quantity of packets lost between the upstream node and the downstream node among all the nodes is zero, and if the quantity is not zero, determine that a link between the upstream node and the downstream node is the faulty link.

Referring to FIG. 5, in this embodiment, the acquiring module 302 further includes a determining unit 302c, configured to determine, before the first calculating unit calculates the quantities of packets that are received by all the nodes between the same start program clock reference value and the same end program clock reference value, whether end program clock reference values reported by all the nodes are consistent, if the end program clock reference values are consistent, continue to perform the step of calculating the quantities of packets that are received by all the nodes between the same start program clock reference value and the same end program clock reference value, and if the end program clock reference values are inconsistent, correct an end program clock reference value of a node until the end program clock reference values reported by all the nodes are consistent, where the end program clock reference value of the node is inconsistent with end program clock reference values of other nodes, and continue to perform the step of calculating the quantities of packets that are received by all the nodes between the same start program clock reference value and the same end program clock reference value.

The correcting the end program clock reference value of the node, where the end program clock reference value of the node is inconsistent with the end program clock reference values of the other nodes, includes sending a correction message to the node whose end program clock reference value is inconsistent with those of the other nodes, so that the node whose end program clock reference value is inconsistent with those of the other nodes modifies the quantity of packets that carry a program clock reference value, where the quantity of packets that carry a program clock reference value is used as its own interval, and collects statistical data at an interval of the modified quantity of packets that carry a program clock reference value.

Figure 6:
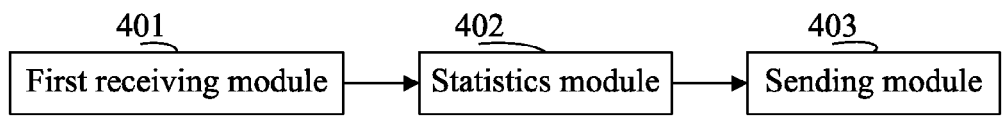
FIG. 6 is a schematic diagram of a node provided in Embodiment 3 of the present disclosure.

FIG. 6 illustrates an embodiment of the present disclosure that provides a node, which includes a first receiving module 401, a statistics module 402, and a sending module 403.

The first receiving module 401 is configured to receive an enabling instruction delivered by a link fault detection apparatus and acquire a current program clock reference value.

The statistics module 402 is configured to collect statistical data starting from the current program clock reference value.

The sending module 403 is configured to send the statistical data to the link fault detection apparatus every preset quantity of packets that carry a program clock reference value, so that the link fault detection apparatus analyzes the statistical data to determine a faulty link, where the statistical data includes a start program clock reference value and an end program clock reference value, and the quantity of packets received at the start program clock reference value and the quantity of packets received at the end program clock reference value.

Figure 7:
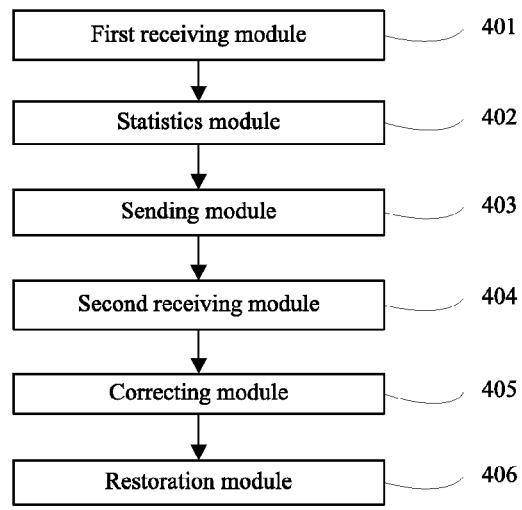
FIG. 7 is a schematic diagram of another node provided in Embodiment 3 of the present disclosure.

In the embodiment of FIG. 7, the node further includes a second receiving module 404, a correcting module 405 and restoration module 406. The second receiving module 404 is configured to receive a correction message sent by the link fault detection apparatus, when the link fault detection apparatus determines that an end program clock reference value sent by the sending module is inconsistent with end program clock reference values sent by other nodes.

The correcting module 405 is configured to correct, according to the received correction message, the quantity of packets that carry a program clock reference value, where the quantity of packets that carry a program clock reference value is used as its own interval, so as to obtain the new quantity of packets that carry a program clock reference value, where the new quantity of packets that carry a program clock reference value is used as an interval, and collect statistical data again, until the end program clock reference value reported by the node is consistent with the end program clock reference values of the other nodes.

The restoration module 406 is configured to, after statistical counting and reporting are performed at an interval of the new quantity of packets that carry a program clock reference value, restore the quantity of packets that carry a program clock reference value to the preset quantity of packets that carry a program clock reference value, where the quantity of packets that carry a program clock reference value is used as an interval.

Figure 8:
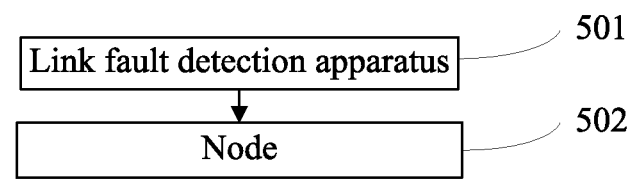
FIG. 8 is a schematic diagram of a faulty link detection system provided in Embodiment 3 of the present disclosure.

Referring to FIG. 8, an embodiment of the present disclosure further provides a faulty link detection system, including a link fault detection apparatus 501 and a node 502.

The link fault detection apparatus 501 is configured to receive statistical data that is reported by all nodes every preset quantity of packets that carry a program clock reference value, where all the nodes collect statistical data starting from a unified program clock reference value, and the statistical data includes a start program clock reference value and an end program clock reference value, and the quantity of packets received at the start program clock reference value and the quantity of packets received at the end program clock reference value; acquire, according to the statistical data, the quantity of packets lost between an upstream node and a downstream node among all the nodes; and determine a faulty link according to the quantity of packets lost between the upstream node and the downstream node.

The node 502 is configured to receive an enabling instruction delivered by the link fault detection apparatus and acquire a current program clock reference value; collect statistical data starting from the current program clock reference value; and send the statistical data to the link fault detection apparatus every preset quantity of packets that carry a program clock reference value, so that the link fault detection apparatus analyzes the statistical data to determine the faulty link.

Beneficial effects of the technical solution provided in this embodiment of the present disclosure are as follows. A faulty link detection apparatus acquires statistical data collected at a unified reference time by different network nodes, and obtains, through comparison, the accurate quantity of packets lost between an upstream node and a downstream node, thereby ensuring that an IPTV service operator locates a network fault quickly and effectively, assisting an operation and maintenance engineer in quickly removing a fault, and improving the quality of operation and maintenance as well as service of an IPTV network.

The apparatus, node, and system provided in this embodiment may specifically belong to the same concept as the method embodiments. For details about specific implementation processes, reference is made to the method embodiments, and the details are not described herein again.

All or part of the foregoing technical solutions provided in the embodiments of the present disclosure may be implemented by a program instructing relevant hardware. The program may be stored in a readable storage medium, and the storage medium may include any medium that is capable of storing program codes, such as a ROM, a RAM, a magnetic disk, or an optical disk.

The foregoing descriptions are merely exemplary embodiments of the present disclosure, but are not intended to limit the present disclosure. Any modification, equivalent replacement, or improvement made without departing from the spirit and principle of the present disclosure shall all fall within the protection scope of the present disclosure.

What is claimed is:

1. A faulty link detection method, comprising:
    receiving statistical data that is reported by all of a plurality of nodes for every preset quantity of packets that carry a program clock reference value, wherein the nodes collect statistical data starting from a unified program clock reference value and the statistical data comprises a start program clock reference value, an end program clock reference value, a quantity of packets received at the start program clock reference value and a quantity of packets received at the end program clock reference value;
    acquiring, according to the statistical data, the quantity of packets lost between an upstream node and a downstream node among all the nodes; and
    determining a faulty link according to the quantity of packets lost between the upstream node and the downstream node.

2. The method according to claim 1, wherein acquiring the quantity of packets lost comprises:
    calculating, according to the quantity of packets received at the start program clock reference value, the quantity of packets received at the end program clock reference value, the quantities of packets that are received by all the nodes between the same start program clock reference value and the same end program clock reference value; and
    calculating, according to the quantities of packets that are received by all the nodes between the same start program clock reference value and the same end program clock reference value, the quantity of packets lost between the upstream node and the downstream node among all the nodes.

3. The method according to claim 2, wherein, before calculating the quantities of packets that are received by all the nodes between the same start program clock reference value and the same end program clock reference value, the method further comprises:
    determining whether or not end program clock reference values reported by all the nodes are consistent;
    if the end program clock reference values are consistent, continuing to perform the step of calculating the quantities of packets that are received by all the nodes between the same start program clock reference value and the same end program clock reference value; and
    if the end program clock reference values are not consistent, correcting an end program clock reference value of a node until the end program clock reference values reported by all the nodes are consistent, wherein the end program clock reference value of the node is inconsistent with end program clock reference values of other nodes, and continuing to perform the step of calculating the quantities of packets that are received by all the nodes between the same start program clock reference value and the same end program clock reference value.

4. The method according to claim 3, wherein correcting the end program clock reference value of the node comprises sending a correction message to the node whose end program clock reference value is inconsistent with those of the other nodes, so that the node whose end program clock reference value is inconsistent with those of the other nodes modifies the quantity of packets that carry a program clock reference value and collects statistical data at an interval of the modified quantity of packets that carry a program clock reference value, wherein the quantity of packets that carry a program clock reference value is used as its own interval.

5. The method according to claim 1, wherein determining the faulty link comprises:
    determining whether the quantity of packets lost between the upstream node and the downstream node among all the nodes is zero; and
    if the quantity is not zero, determining that a link between the upstream node and the downstream node is the faulty link.

6. The method according to claim 1, wherein the nodes are part of an Internet Protocol television system.

7. A faulty link detection apparatus, comprising:
    a receiving module, configured to receive statistical data that is reported by all nodes every preset quantity of packets that carry a program clock reference value, wherein all the nodes collect statistical data starting from a unified program clock reference value and the statistical data comprises a start program clock reference value, an end program clock reference value, the quantity of packets received at the start program clock reference value, and the quantity of packets received at the end program clock reference value;

an acquiring module, configured to acquire, according to the statistical data, the quantity of packets lost between an upstream node and a downstream node among all the nodes; and a determining module, configured to determine a faulty link according to the quantity of packets lost between the upstream node and the downstream node.

8. The apparatus according to claim 7, wherein the acquiring module comprises:

a first calculating unit, configured to calculate the quantities of packets that are received by all the nodes between the same start program clock reference value and the same end program clock reference value according to the quantity of packets received at the start program clock reference value and the quantity of packets received at the end program clock reference value; and a second calculating unit, configured to calculate the quantity of packets lost between the upstream node and the downstream node among all the nodes according to the quantities of packets that are received by all the nodes between the same start program clock reference value and the same end program clock reference value.

9. The apparatus according to claim 8, wherein the acquiring module further comprises a determining unit, configured to:

before the first calculating unit calculates the quantities of packets that are received by all the nodes between the same start program clock reference value and the same end program clock reference value, determine whether or not end program clock reference values reported by all the nodes are consistent;

if the end program clock reference values are consistent, continue to perform the step of calculating the quantities of packets that are received by all the nodes between the same start program clock reference value and the same end program clock reference value; and if the end program clock reference values are not consistent, correct an end program clock reference value of a node until the end program clock reference values reported by all the nodes are consistent, wherein the end program clock reference value of the node is inconsistent with end program clock reference values of other nodes, and continue to perform the step of calculating the quantities of packets that are received by all the nodes between the same start program clock reference value and the same end program clock reference value.

10. The apparatus according to claim 9, wherein the determining unit is configured to correct the end program clock reference value of the node by sending a correction message to the node whose end program clock reference value is inconsistent with those of the other nodes, so that the node whose end program clock reference value is inconsistent with those of the other nodes modifies the quantity of packets that carry a program clock reference value, wherein the quantity of packets that carry a program clock reference value is used as its own interval, and collecting statistical data at an interval of the modified quantity of packets that carry a program clock reference value.

11. The apparatus according to claim 7, wherein the determining module is specifically configured to:

determine whether the quantity of packets lost between the upstream node and the downstream node among all the nodes is zero; and if the quantity is not zero, determining that a link between the upstream node and the downstream node is the faulty link.

12. The apparatus according to claim 7, wherein the apparatus is part of an Internet Protocol television system.

13. A node, comprising:

a first receiving module, configured to receive an enabling instruction delivered by a link fault detection apparatus and acquire a current program clock reference value;

a statistics module, configured to collect statistical data starting from the current program clock reference value; and a sending module, configured to send the statistical data to the link fault detection apparatus every preset quantity of packets that carry a program clock reference value, so that the link fault detection apparatus analyzes the statistical data to determine a faulty link, wherein the statistical data comprises a start program clock reference value, an end program clock reference value, a quantity of packets received at the start program clock reference value and a quantity of packets received at the end program clock reference value.

14. The node according to claim 13, further comprising:

a second receiving module, configured to receive a correction message sent by the link fault detection apparatus, when the link fault detection apparatus determines that the end program clock reference value sent by the sending module is inconsistent with end program clock reference values sent by other nodes;

a correcting module, configured to correct, according to the received correction message, the quantity of packets that carry a program clock reference value, wherein the quantity of packets that carry a program clock reference value is used as its own interval, so as to obtain the new quantity of packets that carry a program clock reference value, wherein the new quantity of packets that carry a program clock reference value is used as an interval, and collect statistical data again, until the end program clock reference value reported by the node is consistent with the end program clock reference values of the other nodes; and a restoration module, configured to, after statistical counting and reporting are performed at an interval of the new quantity of packets that carry a program clock reference value, restore the quantity of packets that carry a program clock reference value to the preset quantity of packets that carry a program clock reference value, wherein the quantity of packets that carry a program clock reference value is used as an interval.

15. The node according to claim 13, wherein the node is part of an Internet Protocol television system.

16. A faulty link detection system, comprising:

a link fault detection apparatus, configured to receive statistical data that is reported by all nodes every preset quantity of packets that carry a program clock reference value, wherein all the nodes collect statistical data starting from a unified program clock reference value, and the statistical data comprises a start program clock reference value, an end program clock reference value, a quantity of packets received at the start program clock reference value and a quantity of packets received at the end program clock reference value; to acquire, according to the statistical data, the quantity of packets lost between an upstream node and a downstream node among all the nodes; and to determine a faulty link according to the quantity of packets lost between the upstream node and the downstream node; and a node, configured to receive an enabling instruction delivered by the link fault detection apparatus and acquire a current program clock reference value; to collect statistical data starting from the current program clock reference value; and to send the statistical data to the link fault detection apparatus every preset quantity of packets that carry a program clock reference value, so that the link fault detection apparatus analyzes the statistical data to determine the faulty link.

\* \* \* \* \*